United States Patent [19]

Beck et al.

[11] Patent Number: 5,049,009

[45] Date of Patent: Sep. 17, 1991

[54] IMPROVED CUTTING TOOL

[75] Inventors: Graydon L. Beck, Cuyahoga Falls; Kenneth Skrabec, Medina, both of Ohio

[73] Assignees: The Weldon Tool Company, Cleveland; SGS Tool Company, Munroe Falls, both of Ohio

[21] Appl. No.: 570,427

[22] Filed: Aug. 21, 1990

[51] Int. Cl.$^5$ .............................................. B23B 51/00
[52] U.S. Cl. ........................................ 407/54; 407/61; 407/63; 407/34; 407/42
[58] Field of Search .................. 407/57, 53, 54, 60, 407/61, 62, 63, 64, 58, 59, 57, 56, 55, 34, 42

[56] References Cited

U.S. PATENT DOCUMENTS

| | | | |
|---|---|---|---|
| 3,003,224 | 10/1961 | Reboch | 407/54 |
| 4,220,429 | 9/1980 | Powers et al. | 407/54 |
| 4,265,574 | 5/1981 | Eckle | 407/54 |
| 4,285,618 | 8/1981 | Shonley | 407/54 |
| 4,572,714 | 2/1986 | Suzuki | 407/54 |
| 4,721,421 | 1/1988 | Klinger | 407/54 |
| 4,810,136 | 3/1989 | Paige | 407/54 |
| 4,893,968 | 1/1990 | Levy | 407/57 |

Primary Examiner—James G. Smith
Assistant Examiner—Blynn Shideler
Attorney, Agent, or Firm—Oldham & Oldham Co.

[57] ABSTRACT

An improved rotary cutting end mill which includes an arcuate shaped circular land on the first relief wall which contacts the cutting edge and a slightly angled cutting end. This end mill yields a smooth finished surface on the work piece and can be used at higher rotary speeds. This end mill shows less corner wear, improved rigidity and is operated with less operating noise.

8 Claims, 4 Drawing Sheets

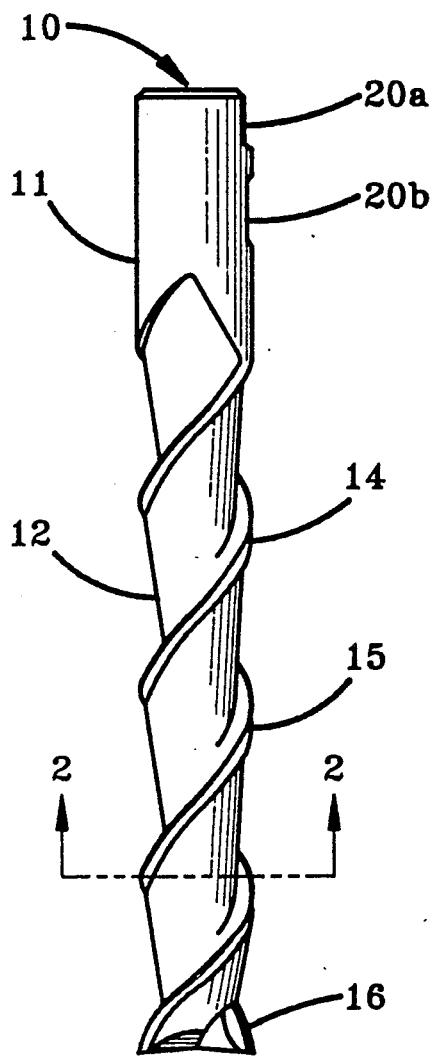
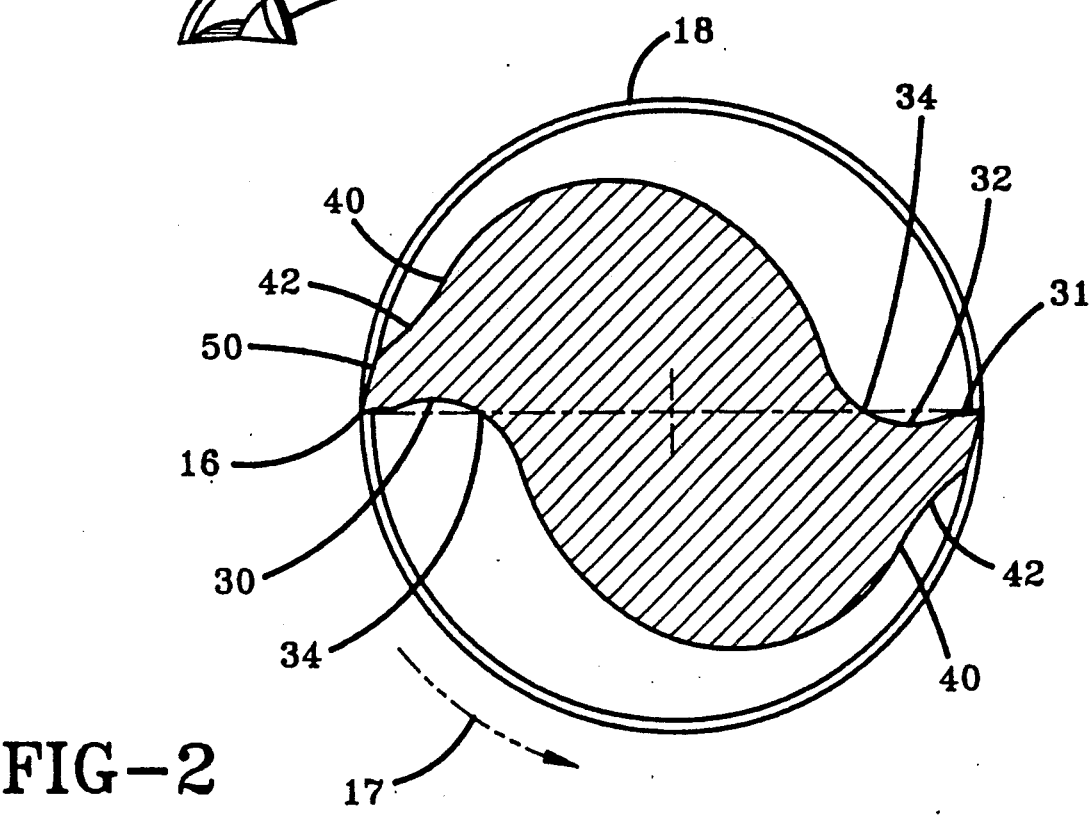
FIG-1
FIG-2

IMPROVED CUTTING TOOL

TECHNICAL FIELD

The present invention relates, generally, to rotating milling cutters. More specifically, the present invention relates to tungsten carbide end mills and the like.

BACKGROUND OF THE INVENTION

A variety of end mills for use with rotating milling cutters are available and well known. Depending on design, such end mills are generally used in right hand cutting, right hand spiral and center cutting. Conventionally, these end mills are made from different types of hardened steel. Standard end mills are supplied in a two or more flute design. A number of end mills have only one operating surface on the cutting face wall. Such end mills often have problems with chips adhering to the cutting face wall and do not achieve a cut as clean as an end mill with two operating surfaces.

U.S. Pat. No. 3,003,224 to Ribich discloses an end mill with two operating surfaces on the cutting face wall, a primary and a secondary tooth surface. This end mill did achieve a cleaner cut and greatly reduced the problems with chips adhering to the cutting face walls.

However, while an improvement over prior end mills, this end mill has several deficiencies and limitations, particularly when used with the high speed machining capabilities of the present state of the art. First, corner wear and chipping edges are a continuing problem. Second, during use, the end mill often creates a loud squeaking noise. Furthermore, the end mill has a limited useful life and can only be used at limited speeds.

SUMMARY

The present invention provides a novel end mill cutting tool. More specifically, the present invention provides an end mill made of tungsten carbide which has produced unexpected results regarding corner wear, noise reduction, high speed use and improved rigidity.

Until now, an end mill such as the present invention made of tungsten carbide was not thought possible. Such an idea was not obvious to a number of carbide machinists although similar end mills have been around for many years. Additionally, the problem of operation noise and corner chipping was not solved until the development of the present invention. Prior end mills could not operate at the necessary high speeds without noise, wear and flute clogging.

It is, therefore, an object of the present invention to provide an improved end mill cutting tool which lasts substantially longer than similar tools.

It is also an object of the present invention to provide an end mill cutting tool which can be used at much higher cutting speeds than previously possible.

It is also an object of the present invention to provide an end mill cutting tool which possess a greatly improved rigidity.

It is also an object of the present invention to provide an end mill cutting tool which has a greatly reduced incidence of edge chipping and significantly less corner wear.

It is also an object of the present invention to provide an end mill cutting tool which yields a better chip flow and reduce or eliminate flute clogging.

It is also an object of the present invention to provide an end mill cutting tool which greatly reduces the noise caused by contact between the cutting tool and the work piece.

It is yet another object of the present invention to provide an end mill cutting tool which yields an improved surface finish on the work pieces.

These and other objects and advantages will become more readily apparent from the more detailed discussion of the preferred embodiment taken in conjunction with the drawings wherein similar elements are identified by like numerals through several views. Such objects and advantages are achieved by an end mill comprising:

An end mill comprising a shank section having a means for retaining said end mill in a rotary driven apparatus and a fluted portion, being an integral extension of said shank section and having one or more helical teeth, each helical tooth comprises a cutting surface and a peripheral relief wall which intersect to form an angle defining a helical cutting edge at the point of intersection, said helical cutting edge defining an outer circumferential cutting path; said peripheral relief wall having a first and a second relief wall, said first relief wall originating at said helical cutting edge and having a generally arcuate land adjacent to said cutting edge which is substantially parallel to said circumferential cutting path, said first relief wall continuing its length to a first back off line, said continuing length of first relief wall generally having a substantially constant clearance angle with respect to said circumferential cutting path, said first back off line defining the juncture between the first relief wall and said second relief wall; said second relief wall extending from said first back off line to a second back off line and having a substantially constant clearance angle greater that said first relief wall, with respect to said circumferential cutting path; said cutting surface defining one or more tooth surfaces, present on the same side with respect to a diameter line passing through said cutting edge and the center of said circumferential cutting path as said peripheral relief wall of said related tooth, a first tooth surface extending from said cutting edge to a chip take-off line and defining an essentially acute angle with said diameter line, a second tooth surface arcuately extending from said chip take off line to an intersection with said diameter line, said fluted portion further comprising a terminal end of said end mill, at the end opposite the shank and having two or more essentially equal cutting edges joined at a center point, any two said cutting edges defining an obtuse angle with respect to a reference line drawn between the cutting edge of each helical tooth.

BRIEF DESCRIPTION OF THE DRAWINGS

FIG. 1 is a side view of an end mill according to the present invention.

FIG. 2 is a transverse cross sectional view taken along line 2—2 in FIG. 1 which has been enlarged for purposes of illustration.

DETAILED DESCRIPTION

Figure 3:
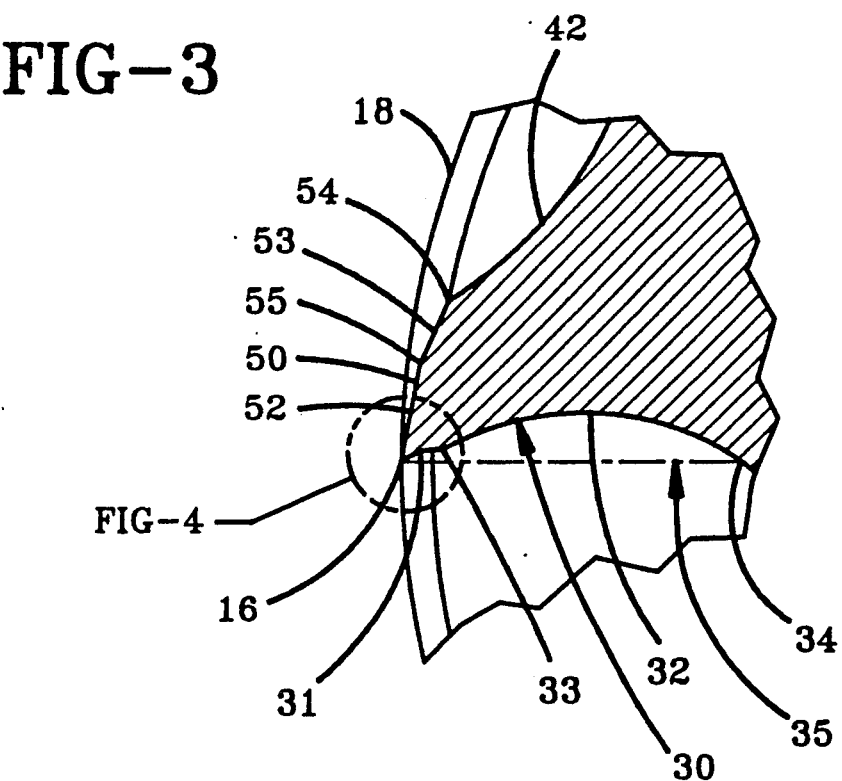
FIG. 3 is an enlarged fragmentary cross-sectional view of a cutting tooth of an end mill according to the present invention.

Now, this invention will be described in detail with reference to the preferred embodiment thereof. FIG. 1 illustrates an end mill 10 according to the present invention, comprising a shank section 11 and a fluted section 12.

Shank section 11 is essentially cylindrical in shape and possesses two rectangular grooves 20a and 20b cut into its outer surface. Grooves 20a and 20b serve to provide a means for retaining end mill 10 in the rotary driven apparatus and any number of grooves are contemplated.

Fluted section 12 of end mill 10 possesses a set of spiral or helical cutting teeth. The preferred embodiment illustrates an end mill with two cutting teeth 14 and 15, although any number of teeth are contemplated. These cutting teeth 14 and 15 are identical in size and design. Such teeth spiral around the outer circumference of said end mill 10. Each tooth 14 or 15 has a cutting edge line 16 on its outermost surface.

FIG. 2 is an enlarged transverse cross-sectional view taken along line 2—2 of FIG. 1 as viewed from the cutting end toward the shank. Arrow 17 indicates the direction of the tool's rotation. Cutting edge 16 is again indicated and shown as the outermost edge contacting the work piece. The movement of cutting edge 16 is indicated by cutting path 18.

The preferred embodiment illustrated in FIG. 2 shows a two-fluted end mill with two cutting surfaces 30 and two non-cutting surfaces 40. Each cutting surface 30 begins at cutting edge 16 and terminates at reference point 34 and is generally divided into two surfaces, a polished primary tooth surface 31 and a secondary tooth surface 32. Non-cutting surfaces 40 are further divided into a peripheral relief wall 50 and a back side wall 42.

Figure 3A:
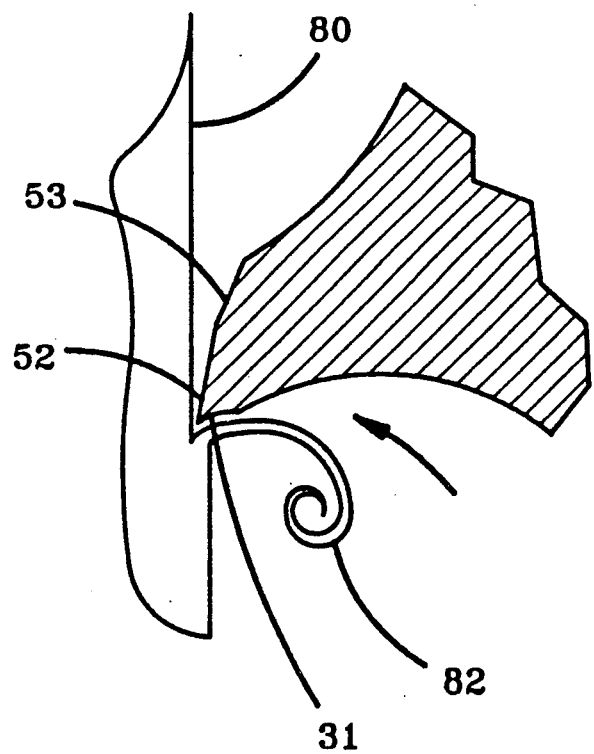
FIG. 3a is an enlarged fragmentary cross-sectional view of a cutting tooth of an end mill according to the present invention illustrating the tool's chip clearance.

FIG. 3 is an isolated view of a cutting tooth. Primary tooth surface 31 originates on one end at cutting edge 16, forms an essentially acute angle with the furnished radius line 35 and terminates at the chip take-off line 33. Primary tooth surface 31 forms a smooth, slight curve which recesses into end mill 10. The chip take-off line 33 is helical and runs essentially parallel to cutting edge 16 along the length of each helical tooth 14 and 15. The shape of this primary cutting surface is well known in the art and referred to as a K-land. The K-land causes the chips to form tight curls and clear the chip away from the cutting edge, as shown in FIG. 3a. In this way the chip does not contact the full length of the flute, thereby reducing chip adhesion and flute clogging. Additionally, the tightly curled chip being cleared away from the full length of the flute allows coolant to flow behind the chip. This improved coolant flow causes improved cooling and lubricity of end mill 10, which in turn minimizes or eliminates chip adhesion and flute clogging.

The secondary tooth surface 32 originates at the chip take-off line 33 on one end and has a substantial arcuate shape. Secondary tooth surface 32 terminates at approximately the point 34 at which it crosses a radius line formed between the cutting edge 16 and the center point of circular cutting path 18. Primary tooth surface or the K-land 31 comprises generally 10–30% of the overall length of a cutting surface 30, with FIG. 3 illustrating a K-land having approximately 13% of the cutting surface 30's overall length.

Again looking at FIG. 3, peripheral relief wall, generally 50, originates at cutting edge 16 and terminates at a second back line 54. Peripheral relief wall 50 comprises a first relief wall surface 52 and a second relief wall surface 53. First relief wall surface 52 meets cutting path 18 at cutting edge 16 to form an acute angle opening away from cutting surface 30. First relief wall surface 52 terminates at first back-off line 55. Second relief wall surface 53 extends from first back-off line 55 to second back-off line 54. This second relief wall 53 forms a slightly larger acute angle with cutting surface 30 than first relief wall surface 52.

Figure 4:
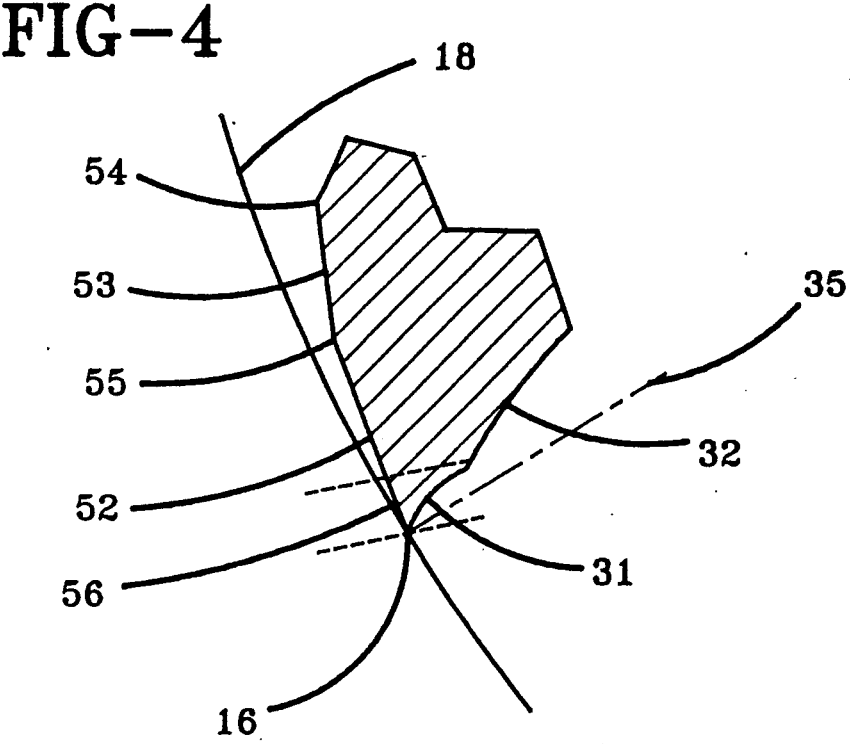
FIG. 4 is a greatly enlarged fragmentary cross-sectional view of the cutting edge of the cutting tooth of an end mill according to the present invention.

FIG. 4 shows an enlarged view of a cutting tooth. This view more clearly illustrates a circular land 56 formed in the terminal end of first relief wall 52 immediately adjacent to and contacting cutting edge 16. Circular land 56 is essentially arcuate in shape and is essentially parallel to the arc of cutting path 18 formed by cutting edge 16. Circular land 56 forms an essentially right angle with a radius line 35 struck through cutting edge 16. The shape of circular land 56 is critical to the present invention, serves to quiet the tool, especially at the high speeds now possible, and yields an improved surface finish on the work piece.

Figure 4A:
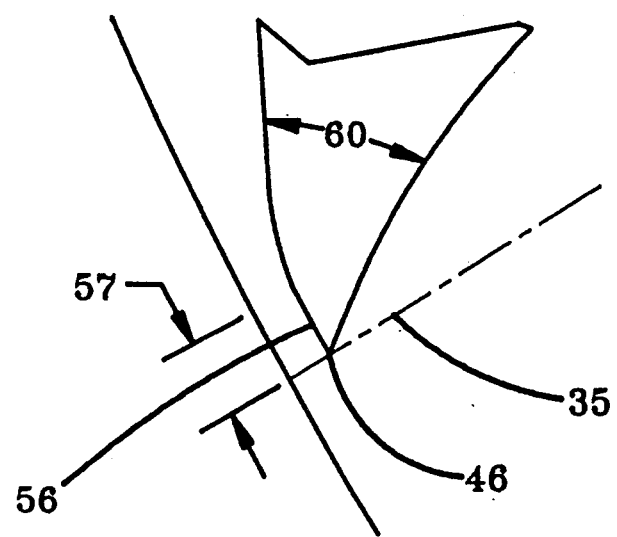
FIG. 4a is a still further enlarged fragmentary cross-sectional view of the cutting tooth illustrating the circular land.

The circular land 56 formed in the end of first relief wall surface 52 is essentially 0.003–0.005 inches in width 57 and is illustrated in a greatly enlarged view of FIG. 4a. The width of circular land 56 is critical. When circular land 56 is dimensioned less than 0.003 inches in width, cutting edge 16 is too sharp and the loud squeaking noise associated with the prior art tools is heard. Circular land 56 when dimensioned at a width 57 greater than 0.005 inches forms a cutting edge 16 which is too dull to perform the task for which it is designed. The circular land 56 is on the total length of cutting edge line 16.

Figure 5:
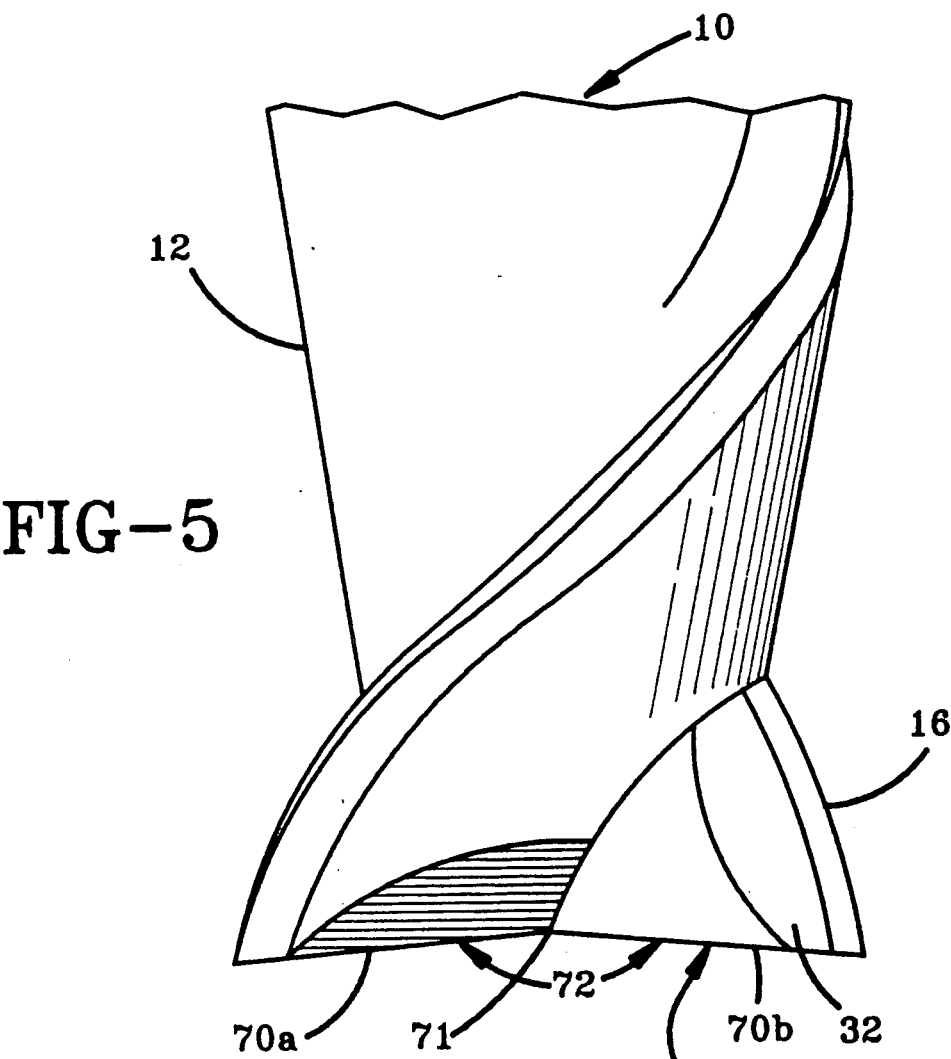
FIG. 5 is a fragmentary enlarged side view of the cutting end of the end mill according to the present invention.

FIG. 5 shows an enlarged side view of the cutting end of end mill 10. Cutting edge 16 and secondary tooth surface 32, previously discussed, are further illustrated in this additional view. End cutting edge 70 is shown as comprising two essentially equal edges 70a and 70b. The cutting edges 70a and 70b meet at center point 71 to define angle 72. The present invention, however, discloses cutting edge 70 such that its two separate edges define angle 72 as ranging from 177°–179.5°. Such a change has yielded unexpected results regarding tooth life. This slight angular modification greatly reduces the chipping of end mill cutting teeth and reduces corner wear.

Figure 6:
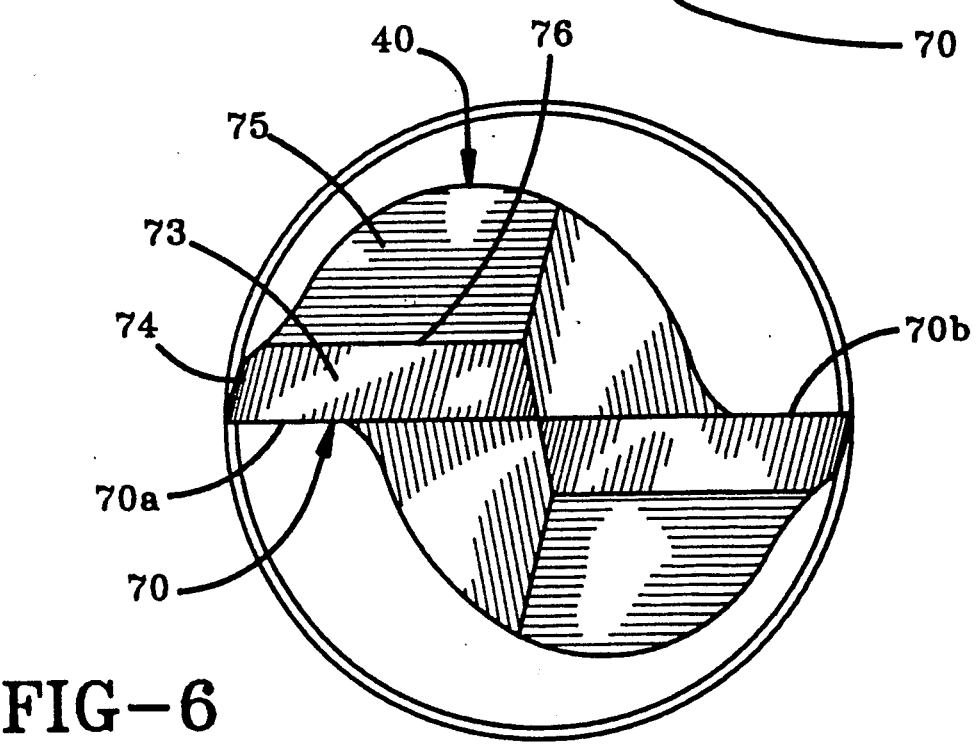
FIG. 6 is an enlarged end view of the cutting end of the end mill according to the present invention.

FIG. 6 illustrates the end view of the cutting end of end mill 10 when viewed from the end toward the shank 11. The cutting end shows cutting edges 70a and 70b and an end relief face wall 73. End relief face wall is formed by a primary back-off surface 74 which extends from cutting edge 70 to a first back-off line 76. The secondary back-off surface 75 extends from the first back-off line 76 and terminates at the intersection with the non-cutting surfaces 40.

The two significant improvements over the prior art are shown in the shape of circular land 56 and the angular modification of the end cutting edge 70. Such slight alterations in the prior art have produced unexpectedly remarkable improvements in the quality of cut, reducing operating noise, and increasing the life of the tool particularly at the high machining speeds now possible. Such improvements would not have been obvious to an artisan of ordinary skill in the art as evidenced by the fact that such improvements are made herein on a tool that has seen little or no change in over 20 years.

The preferred embodiment of the present invention is manufactured of tungsten carbide. Tungsten carbide gives the end mill of the present invention strength and durability not possible with hardened steel end mills. For many years, it was not thought possible to manufacture such an end mill out of tungsten carbide. Other alloys of tungsten are also contemplated.

The present invention, when made out of tungsten carbide, lasts 20 times longer than end mills made with conventional hardened steel. The composition, coupled with functional changes in the tool's design, specifically the angled end cutting edge 70, have yielded an end mill which will resist tooth chipping and experiences less corner wear.

This tool has a greatly improved rigidity and can operate at virtually unlimited speeds. The present invention can feed up to 500 inches per minute in contrast to approximately 20-30 inches per minute using conventional end mills.

Most importantly, the present invention yields an improved cut on the surface of the work piece and better chip flow. These improvements can be attributed to the k-land on the cutting surface 30 and the improved shape of the circular land on the first relief surface 52. This same improvement greatly reduces the noise caused by the tool cutting edge 16 contacting the work piece.

While in accordance with the patent statutes the best mode and preferred embodiment of the invention has been described, it is to be understood that the invention is not limited thereto, but rather is to be measured by the scope and spirit of the appended claims.

What is claimed is:

1. An improved rotary cutting end mill of the type having a shank section, a means for retaining said end mill in a rotary driven apparatus, a fluted portion being an integral extension of said shank section, a terminal end of said end mill at the end opposite the shank, one or more helical teeth formed on the outer surface of said fluted portion, each tooth comprising a cutting surface and peripheral relief wall which intersect to form an angle defining a helical cutting edge, said helical cutting edge defining an outer circumferential cutting path, and said peripheral relief wall having a first and second relief surface wherein the improvement comprises:

a first relief surface of said peripheral relief wall having an arcuate land segment and a linear land segment along a substantial portion of said cutting edge, said arcuate land being substantially parallel to said cutting path, located immediately adjacent to said helical cutting edge and terminating at a point along said first relief surface, said linear land segment connecting said arcuate land segment and said second relief surface and defining a surface tapered inward from said cutting path.

2. An improved end mill as recited in claim 1 wherein the arcuate land segment of said first relief surface has a width ranging from about 0.003 to about 0.005 inches.

3. An improved end mill as recited in claim 1 wherein said end mill is made from a tungsten alloy.

4. An improved end mill as recited in claim 3 wherein said end mill is made from tungsten carbide.

5. An improved rotary cutting end mill of the type having a shank section, a means for retaining said end mill and a rotary driven apparatus, a fluted portion being an integral extension of said shank section, a terminal end of said end mill at the end opposite the shank, one or more helical teeth formed on the outer surface of said fluted portion, each tooth comprising a cutting surface and a peripheral relief wall which intersect to form an angle defining a helical cutting edge, said helical cutting edge defining an outer circumferential cutting path, and said peripheral relief wall having a first and second relief surface wherein the improvement comprises:

a first relief surface of said peripheral relief wall having an arcuate land segment and a linear segment along a substantial portion of said cutting edge, said arcuate land being substantially parallel to said cutting path, located immediately adjacent to said cutting edge and terminating at a point along said first relief surface, said linear land segment connecting said arcuate land segment with said second relief surface and defining a surface tapered inward from said cutting path, and the terminal end of said end mill defining two or more end cutting edges tapered inwardly to define a concave angle ranging from about 177° to about 179.5°.

6. An improved end mills as recited in claim 5 wherein the arcuate land segment of said first relief surface has a width ranging from about 0.003 to about 0.005 inches.

7. An improved end mill as recited in claim 5 wherein said end mill is made from a tungsten alloy.

8. An improved end mill as recited in claim 7 wherein said end mill is made from tungsten carbide.

* * * * *